US012591511B2

(12) United States Patent
Ostrikov

(10) Patent No.: US 12,591,511 B2
(45) Date of Patent: Mar. 31, 2026

(54) ACCESS-AWARE FLASH TRANSLATION LAYER (FTL) CAPABILITY ON FLASH MEMORY INTEGRATED CIRCUIT

(71) Applicant: Infineon Technologies LLC, San Jose, CA (US)

(72) Inventor: Sergey Ostrikov, Redwood City, CA (US)

(73) Assignee: Infineon Technologies LLC, San Jose, CA (US)

( * ) Notice: Subject to any disclaimer, the term of this patent is extended or adjusted under 35 U.S.C. 154(b) by 0 days.

(21) Appl. No.: 18/433,988

(22) Filed: Feb. 6, 2024

(65) Prior Publication Data

US 2025/0252043 A1 Aug. 7, 2025

(51) Int. Cl.
*G06F 12/02* (2006.01)

(52) U.S. Cl.
CPC .. *G06F 12/0246* (2013.01); *G06F 2212/7201* (2013.01)

(58) Field of Classification Search
CPC ..................... G06F 12/0246; G06F 2212/7201
See application file for complete search history.

(56) References Cited

U.S. PATENT DOCUMENTS

| | | | | |
|---|---|---|---|---|
| 2014/0095767 A1* | 4/2014 | Trika | .................... | G06F 3/0652 |
| | | | | 711/E12.008 |
| 2019/0073140 A1* | 3/2019 | Yamada | ................ | G06F 3/0679 |
| 2019/0121576 A1* | 4/2019 | Jean | ........................ | G06F 12/14 |
| 2022/0155998 A1* | 5/2022 | Muthiah | ................ | G06F 12/10 |
| 2023/0359766 A1* | 11/2023 | Muthiah | ............. | G06F 21/6254 |

OTHER PUBLICATIONS

International Search Report and Written Opinion of the International Searching Authority for International Application No. PCT/US25/14165 dated Mar. 13, 2025; 7 pages.

* cited by examiner

*Primary Examiner* — Prasith Thammavong

(57) ABSTRACT

An integrated circuit includes an array of flash memory and flash translation layer (FTL) logic coupled to the array and to be coupled to a host device. The FTL logic is configured to receive, from the host device, a write command comprising a first logical address, user data, and an access token and translate the first logical address to a first physical address of the array. In an embodiment, the first physical address has already been programmed. The FTL logic is further to verify the access token as being associated with the first logical address, cause the user data to be programmed to a second physical address of the array, and update at least one logical-to-physical (L2P) mapping table with the second physical address as being mapped to the first logical address.

21 Claims, 7 Drawing Sheets

300A

Receive, by flash translation layer (FTL) logic included in on a flash memory, from a host device, a write command with a first logical address, user data, and an access token. — 305

Translate the first logical address to a first physical address of an array of flash memory on the flash memory chip, wherein the first physical address has already been programmed. — 310

Verify the access token as being associated with the first logical address. — 315

Cause the user data to be programmed to a second physical address of the array. — 320

Update at least one logical-to-physical (L2P) mapping table with the second physical address as being mapped to the first logical address. — 325

300A

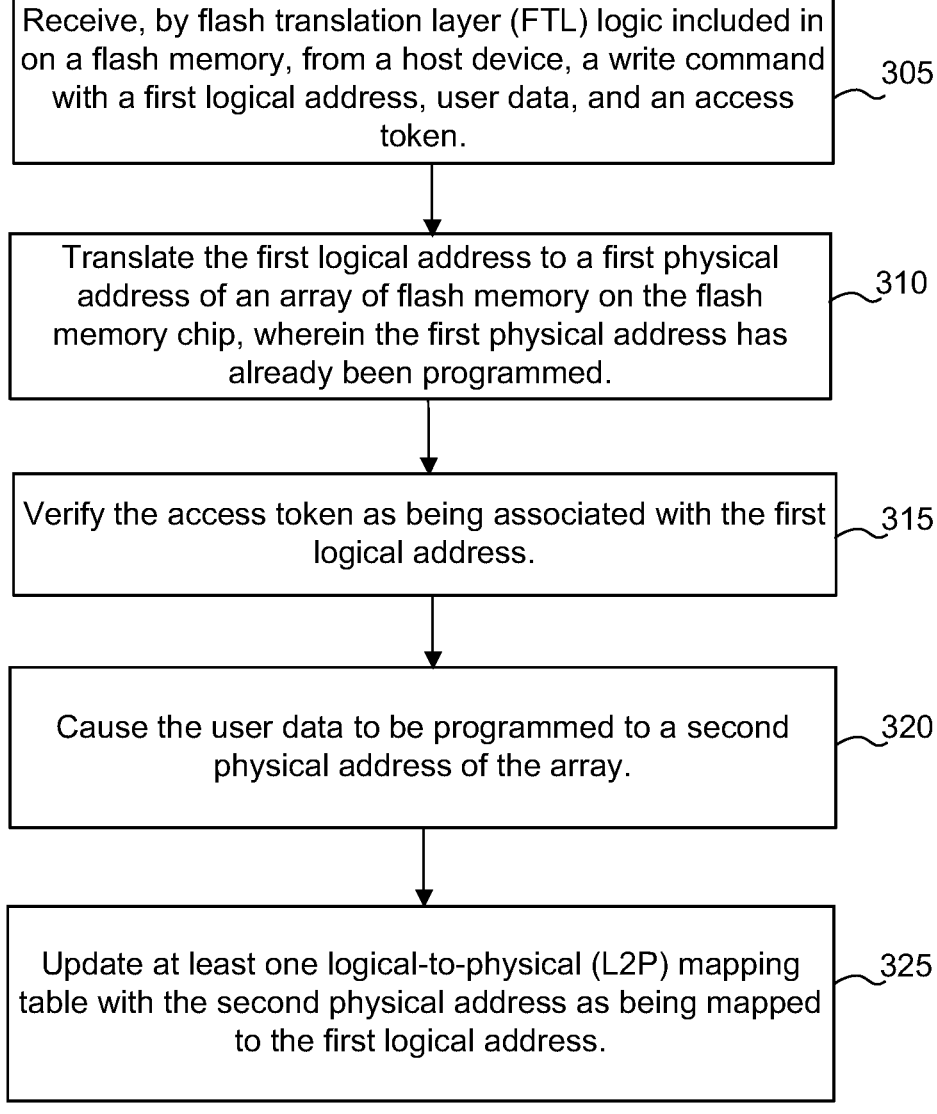

Receive, by flash translation layer (FTL) logic included in on a flash memory, from a host device, a write command with a first logical address, user data, and an access token.    305

Translate the first logical address to a first physical address of an array of flash memory on the flash memory chip, wherein the first physical address has already been programmed.    310

Verify the access token as being associated with the first logical address.    315

Cause the user data to be programmed to a second physical address of the array.    320

Update at least one logical-to-physical (L2P) mapping table with the second physical address as being mapped to the first logical address.    325

Receive a read command with the first logical address. 330

Translate, using the at least one L2P mapping table, the first logical address to the second physical address. 335

To fulfill the read command, cause the user data to be read from the second physical address in the array. 340

300C

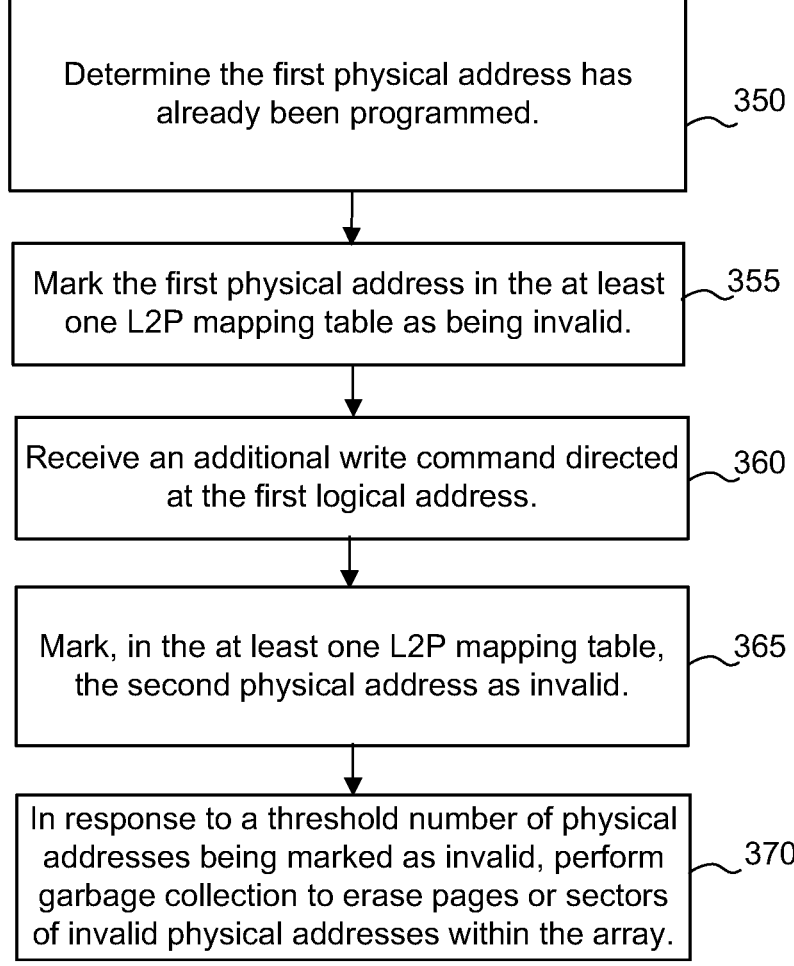

Determine the first physical address has already been programmed. ⟋350

Mark the first physical address in the at least one L2P mapping table as being invalid. ⟋355

Receive an additional write command directed at the first logical address. ⟋360

Mark, in the at least one L2P mapping table, the second physical address as invalid. ⟋365

In response to a threshold number of physical addresses being marked as invalid, perform garbage collection to erase pages or sectors of invalid physical addresses within the array. ⟋370

FIG. 3C

ACCESS-AWARE FLASH TRANSLATION LAYER (FTL) CAPABILITY ON FLASH MEMORY INTEGRATED CIRCUIT

TECHNICAL FIELD

The disclosure relates to the field of memory devices, and in particular, to access-aware flash translation layer (FTL) capability on flash memory integrated circuit.

BACKGROUND

To interact with a flash memory device, there exist three primary operations: read, program, and erase. While read and program operations work on pages, erase operation works on sectors, each consisting of multiple pages. Corner cases aside, a program operation may only be performed on a location that has been previously erased. Given these constraints, updating one page at a fixed location while preserving data at other locations within the same sector is not possible in a single, atomic operation that exists and is available at the integrated circuit (IC) boundary.

For example, to store new data in a second program operation to the same location (e.g., page), the second program operation is converted into multiple flash operations because reprogramming to the same location is not possible due to limitations on flash memory. An example set of flash operations to perform such a second reprogramming operation to the same page includes: reading N–1 pages from a sector containing the page (and thus, not reading the page itself having old data), store (or buffer) the N–1 pages, erase N pages of the sector that contains the page, and program the N pages to the sector, including the N–1 pages of old data and one page of new data. Thus, operations are inefficiently multiplied to program new data to the same page while still preserving old data in the same sector.

Further, secure applications work with assets, e.g., data related to a specific secure application. Thus, access to such assets may be tightly controlled for security purposes. For illustrative purposes, assume that an application has access to an asset stored in the page, but not to any other assets stored in pages of the same sector. To update the asset at that page, the second program operation to the same page must access data that the application is not authorized to access. Thus, performing this second operation also incurs security control issues.

BRIEF DESCRIPTION OF THE DRAWINGS

The disclosure is illustrated by way of example, and not of limitation, in the figures of the accompanying drawings.

FIG. 3A is a flow diagram of a method for employing FTL logic on-chip of a flash IC device when consecutively programming to the same physical address, according to at least one embodiment.

FIG. 3C is a flow diagram of a method for configuring FTL logic to track the consecutive programming to the same physical address, according to at least some embodiments.

DETAILED DESCRIPTION

Figure 1:
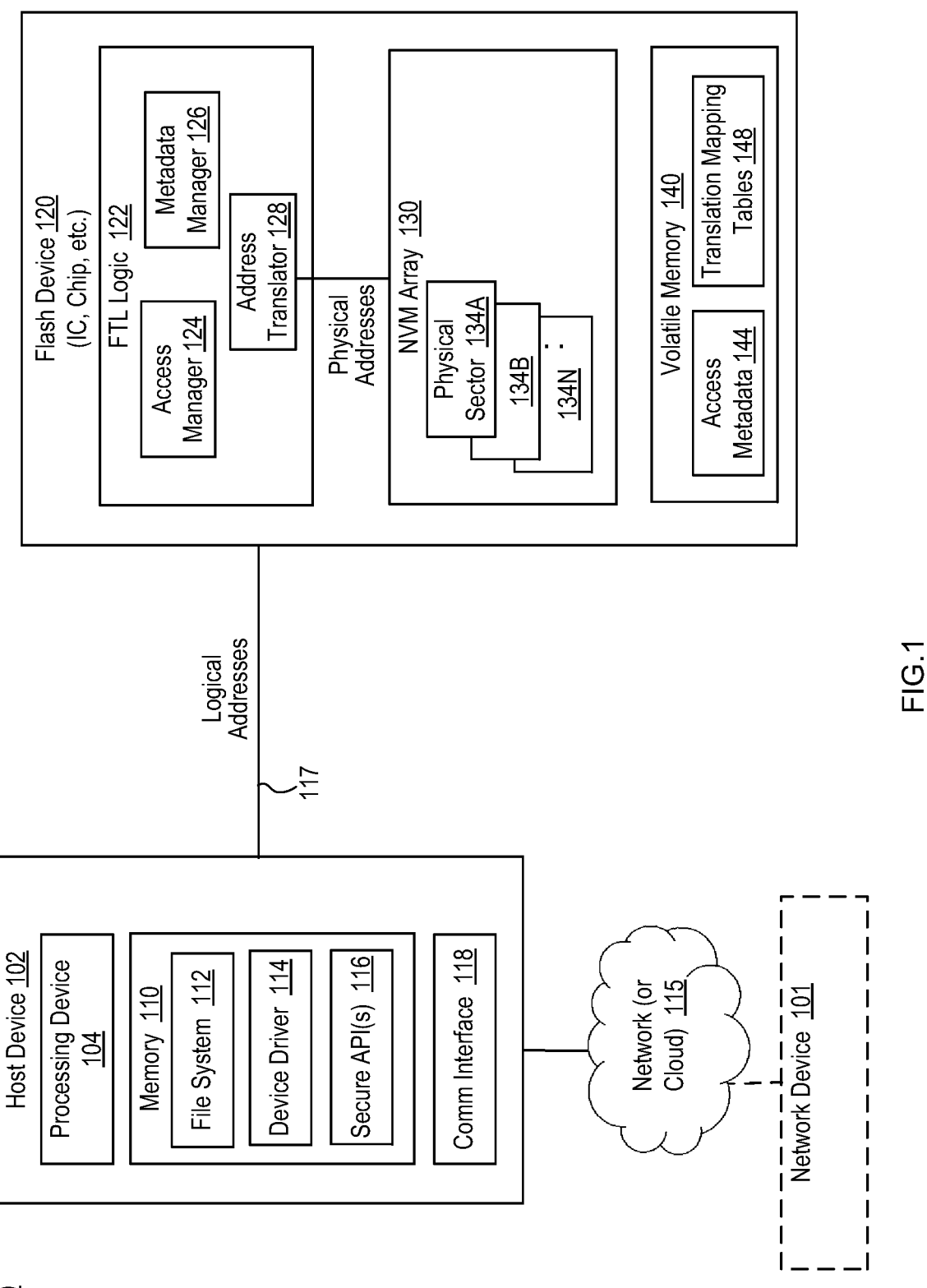
FIG. 1 is a block diagram of a system that employs a flash integrated circuit (IC) device that includes both flash translation layer (FTL) logic and an NVM array of memory cells according to various embodiments.

In some industry efforts, solutions to the above-mentioned deficiencies in programming to individual locations (e.g., physical addresses) in flash memory have been attempted via different approaches. For example, one solution is to store one asset per sector so that each sector is dedicated to only a single secure application. This approach, however, leads to poor utilization of space when assets are smaller than sector size and also leads to a program/erase (PE) cycle per asset update. Thus, the number of asset updates is limited to P/E cycle rating.

Another solution is to increase access granularity to multiple assets, all of which fit within at least one sector. This results in better space utilization, but at the expense of reduced access granularity. At a worse case, there is a single permission to access the entire chip, e.g., all sectors of the flash memory device.

Yet another solution is for the application to encrypt assets to protect data stored within the same individual sectors. While this approach protects against unauthorized access and security risks, this approach does not protect against modification of data, e.g., via erasing the data.

The present disclosure addresses the above deficiencies (and other deficiencies that will be discussed below in more detail) by locating flash translation (FTL) logic on the same flash memory IC so that the security of individually accessed physical addresses is controlled on-chip. This FTL logic may be discrete logic or instantiated within a microcontroller, a microprocessor, a programmed processor, or the like. In some embodiments, the FTL logic performs security access control by verifying access tokens (or keys) associated with each logical address received from a host system verified against a locally stored copy of the access tokens (or keys) in metadata that is accessible by the FTL logic.

For example, in one embodiment, a system includes a host processing device lacking embedded flash memory (which is common in a memory controller used in automotive and some industrial applications) and a single flash memory integrated circuit (IC) coupled to the host processing device. In at least some embodiments, the single flash memory IC includes a memory array and FTL logic coupled to the memory array. In some embodiments, the FTL logic is configured to receive, from the host processing device, a write command with a first logical address, user data, and an access token.

In various embodiments, the FTL logic further translates the first logical address to a first physical address of the memory array, where the first physical address has already been programmed, for example. The FTL logic may further verify the access token as being associated with the first logical address (e.g., via a comparison with a locally stored access token), cause the user data to be programmed to a second physical address of the memory array, and update at least one logical-to-physical (L2P) mapping table with the second physical address as being mapped to the first logical address. In this way, the new data need not be stored at the same first physical address but at a location tracked by the FTL logic.

In some embodiments, this L2P mapping table may then be accessed later in future memory operation accesses to the first logical address to perform L2P address translations, e.g., to determine the actual physical address to which the first logical address is mapped. In some embodiments, the FTL logic further, in response to detecting a threshold number of physical addresses being marked as invalid (due to the valid data being stored elsewhere), perform garbage collection to erase pages or sectors of invalid physical addresses within the memory array. In this way, the FTL logic may handle all logical-to-physical address mapping and other flash media management on behalf of the host system.

Therefore, advantages of the systems and methods implemented in accordance with some embodiments of the present disclosure include, but are not limited to, enabling the host system to issue read and write commands (associated with respective read and program operations) that have no restrictions on programming to the same locations (e.g., physical address) multiple times. This can be made possible, for example, by configuring on-chip FTL logic to handle media management of the flash memory sub-pages, pages, and sectors. Along with improved access granularity comes the advantages of improved space utilization and P/E cycle performance compared to current state-of-the-art approaches. Further, secure application programming interfaces (APIs) may be configured that interact with the flash memory IC device to facilitate the secure interchange of memory commands and data between software applications and the flash memory device. These and additional advantages will be apparent to one of ordinary skill in the art in view of the following description.

FIG. 1 is a block diagram of a system 100 that employs a flash integrated circuit (IC) device 120 (e.g., a flash device or flash memory device) that includes both flash translation layer (FTL) logic 122 and an NVM array 130 of memory cells, e.g., a flash array, according to various embodiments. The NVM array 130 may include multiple physical sectors of flash memory, including a first physical sector 134A, a second physical sector 134B, through to an Nth physical sector 130N. The system 100 may further include a host device 102 (e.g., a microcontroller unit (MCU) or an application processor running customer software, or the like) coupled to the flash device 120 and an optional network device 101. In some embodiments, the network device 101 communicates with the host device 102 (e.g., to obtain data from the NVM array 130) over a network 115 such as the Internet, a local area network (LAN), a wide area network (WAN), or other network.

In at least some embodiments, the host device 102 includes a processing device 104, memory 110 to store software and/or firmware such as a file system 112, a device driver 114 associated with the flash device 120, and secure APIs 116. In some embodiments, the memory 110 is volatile memory, non-volatile memory, or a combination thereof. The host device 102 may further include a communication interface 118, e.g., for communicating over the network 115 with the network device 101 and for communicating with the flash device 120. In various embodiments, the host device 102 is coupled to the flash device 120 via a memory bus 117 such as a serial peripheral interface (SPI) bus, an inter-integrated circuit (I2C) bus, a Universal Serial Bus (USB), a Serial Advanced Technology Attachment (SATA)

bus, a Peripheral Component Interconnect Express (PCIe) bus, or other type of bus transfer protocol, for example.

In some embodiments, a device address space (e.g., of the flash device 120 102) is a set of addresses (e.g., physical addresses) to select storage locations in the NVM array 130 made available via the memory bus 117. In embodiments, the flash device 120 offers operations that access data in the device address space, e.g., a program operation, a read operation, and an erase operation. Restrictions generally apply to the granularity of memory operations with respect to accessed units of data and usually follow a mathematical relation such as $$bit << (G_{program} < G_{erase}),$$

where "G" stands for granularity. In some embodiments, there is a granularity difference between program and erase operations and, in similarly, a significant granularity difference between these memory operations and a smallest unit of data, such as a bit.

In some embodiments, an application address space is a set of addresses (e.g., logical addresses) allocated to an application executed on the host device 102 to store and retrieve data. This application address space generally maps to the device address space. Mapping of application address space to device address space can make the device address space transparent to applications to simplify operations supported in the application address space, e.g., by eliminating restrictions via equating granularity of the operations, e.g., $G_{program} = G_{erase}$ and maximizing granularity of the operations, e.g., $bit = (G_{program} = G_{erase})$.

In various embodiments, the flash device 120 further includes volatile memory 140, coupled to the FTL logic 122, to store metadata, e.g., the access metadata 144 and translation mapping tables 148 accessible by the FTL logic 122 with which to perform flash translation layer media management, as discussed herein. Such flash translation media management may include, for example, mapping the application address space to the device address space for flash devices such as the flash device 120. The FTL logic 122 may use the metadata stored in the volatile memory 140 to verify logical addresses received from the host device 102, e.g., where the access metadata 144 may include logical addresses indexed to access tokens.

In some embodiments, the present disclosure proposes to implement the FTL logic 122 inside of the flash device 120, allowing the host device 102 to issue memory commands for operations enabled in the application address space to the flash device 120. In some embodiments, the FTL logic 122 is configured to provide configurable access granularity, e.g., according to an arbitrary unit of data=($G_{program} = G_{erase}$). In some embodiments, upon detecting a power down and/or periodically, the FTL logic 122 causes the data stored in the access metadata 144 and the translation mapping tables 148 to be backed up or programmed to the NVM array 130, so that these are accessible after reinitialization after the flash device 120 is powered down.

In some embodiments, the FTL logic 122 includes sub-components or sub-operational logic including an access manager 124, a metadata manager 126, and an address translator 128. In some embodiments, the access manager 124 can access and/or update data of the metadata manager 126 and the address translator 128 to accurately perform flash memory media management disclosed herein.

In some embodiments, the flash device 120 is a single integrated system-on-a-chip device (SoC) having all of these components packaged on a single die or chip. The FTL logic 122 may be instantiated within a central processing unit (CPU) adapted to include on-board logic and/or circuitry in addition to processing capability to perform the functions discussed hereinafter. In various embodiments, the FTL logic 122 is discrete logic or instantiated within a micro-controller, a microprocessor, or a programmed processor, e.g., a complex instruction set computing (CISC) micropro-cessor, reduced instruction set computing (RISC) micropro-cessor, very long instruction word (VLIW) microprocessor, or a processor implementing other instruction sets or pro-cessors implementing a combination of instruction sets. In alternative embodiments, the FTL logic 122 is instantiated within a special-purpose processing device such as an appli-cation specific integrated circuit (ASIC), a field program-mable gate array (FPGA), a digital signal processor (DSP), network processor, or the like.

In various embodiments, the secure APIs 116 rely on at least two functions with an acceptable granularity of access for a certain application, e.g., use one access token for each page or for each sub-page if tracking at a sub-page granu-larity. In some embodiments, each write command includes an access token (or key), a logical address, and data to be programmed to the NVM array 130. In some embodiments, each read command includes an access token (or key) and a logical address at which data is desired to be retrieved. In some embodiments, each memory command is crypto-graphically protected such that the FTL logic 122 is con-figured to cryptographically determine, from the memory command, an access token or a logical address to be used to verify and perform the corresponding memory operation.

Thus, in some embodiments, the host processing device (e.g., the host device 102) is configured to provide a unique access token with each respective memory command having a unique logical address. In some embodiments, the single flash memory IC (e.g., the flash device 120) includes the volatile memory 140 coupled to the FTL logic 122. The FTL logic 122 may be further configured to index, within the volatile memory 140, a plurality of logical addresses with a plurality of corresponding access tokens. The FTL logic 122 may further verify logical addresses of the plurality of logical addresses received from the host processing device using the corresponding access tokens retrieved from the volatile memory.

In some embodiments, upon receiving a cryptographically protected write or read command, the access manager 124 requests the metadata manager 126 to determine which access token (or key) is associated with the logical address in the command. The metadata manager 126 may access the access metadata 144 in order to retrieve the corresponding stored access token (or key). The access manager 124 can then verify (or authenticate) the command by optionally decrypting (if encrypted) and comparing the received access token (or key) to the stored access token (or key) for the logical address from the access metadata 144. Assuming verification is successful, the access manager 124 may provide the logical address to the address translator 128. In some embodiments, the address translator determines and provides a corresponding physical address based on walking L2P mapping tables, as will be discussed in more detail with reference to FIGS. 2A-2B. The L2P mapping tables may be configured to provide a desired level of granularity for separate accesses, e.g., accessing an asset at sector level, at page level, or at a finer sub-page level.

The access manager 124 may then program data from a write command to the physical address or read data from the physical address to complete a read command. In some embodiments, the FTL logic 122 accesses and updates the L2P mapping tables of the translation mapping tables 148, as needed, in order to track which physical address is currently mapped to any given logical address to which the host device 102 has access. Table 1 provides a legend of terms used in the L2P mapping tables of FIGS. 2A-2B.

TABLE 1

| Acronym | Term | Acronym | Term |
|---------|------|---------|------|
| lsn | logical sector number | lpn | logical page number |
| psn | physical sector number | ppn | physical page number |
| p | page | data | user data |
| at | access token | spare | metadata for user data; can include invalidity info |
| N | pages per sector | L | lower half |
| M | number of sector-mapped sectors | H | upper half |
| P | number of page-mapped sectors | | |

In Table 1, the term "spare" refers to a column in the page mapping table that contains pointers to entries in the sector mapping table. The term "spare" means that the user data in the page-mapped table is spare/extra copy (latest/valid in fact) for the user data this column points to in the sector-mapped table. Validity flags or indicia may also be embed-ded in or associated with such pointers.

Figure 2A:
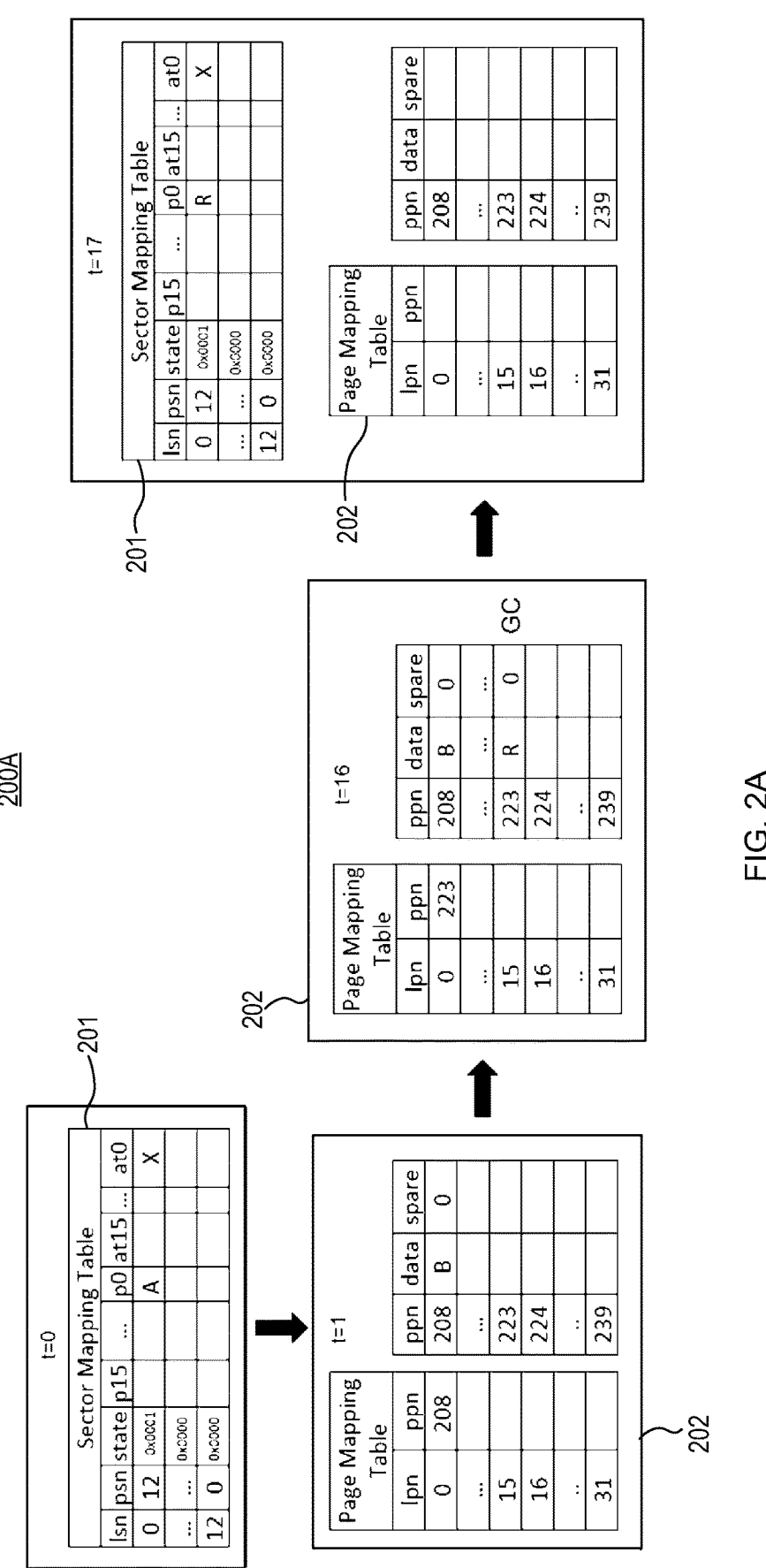
FIG. 2A is an exemplary set of mapping tables and flow of updates to page table mapping when consecutively programming to the same page, according to some embodiments.

FIG. 2A is an exemplary set of mapping tables 200A and flow of updates to page table mapping when consecutively programming to the same page, according to some embodi-ments. For example, the metadata stored in the volatile memory 140 may include, within the translation mapping tables 148, a sector mapping table 201 that maps logical sector numbers to physical sector numbers and a page mapping table 202 associated with the sector mapping table 201. In some embodiments, the page mapping table 202 maps logical page numbers to physical page numbers.

In some embodiments, access granularity is controlled by the number of access tokens or keys. So, for example, in the example of FIG. 2A, access granularity is one access token per page. Thus, in this embodiment, lsn is equal to lpn/N and page offset is equal to lpn modulo N (e.g., lpn % N). In some embodiments, a first logical address includes a logical sector number (lsn) and a logical page number (lpn) or a logical sub-page identifier (see FIG. 2B), which the FTL logic 122 uses to determine a first physical address including a physi-cal sector number (psn) and a physical page number (ppn) or a physical sub-page identifier (see FIG. 2B).

In FIG. 2A, a write command points to a logical sector number of zero ("0"), which maps to a physical sector number of 12, at which data A is originally programmed at page zero ("0") and has an access token (X). Walking a corresponding page mapping table 202 for page zero, a logical page number of zero maps to, at time (t) of one, a physical page number of 208. Because the data is B (e.g., new data), a new location of ppn equal to 208 is chosen and ppn of 207 can be marked as "dirty" or "invalid," meaning that the previous data A is stale and thus invalid. With each program operation of new data from lpn zero, a new physical page number (e.g., physical address) may be sequentially written while the old physical page number marked as invalid, e.g., until a threshold number of writes has been reached. In this example, at time equal to 16, a $16^{th}$ program to the same logical page number results in a ppn mapping of 223.

In this way, the FTL logic 122 keeps track of consecutive program operations performed directed at the same logical page number. The FTL logic 122 may further, in response to reaching a threshold number of physical addresses being marked as invalid, perform garbage collection to erase pages or sectors of invalid physical addresses within the array. How big the erasure unit is may depend on the granularity of access and access tokens, as has been discussed. As illustrated, at time equal to 17, the mapping of logical page number returns to being mapped to a physical page number of 208. The cycle can then start over with only a single erase operation being employed after 16 successful program operations to the same logical address.

Figure 2B:
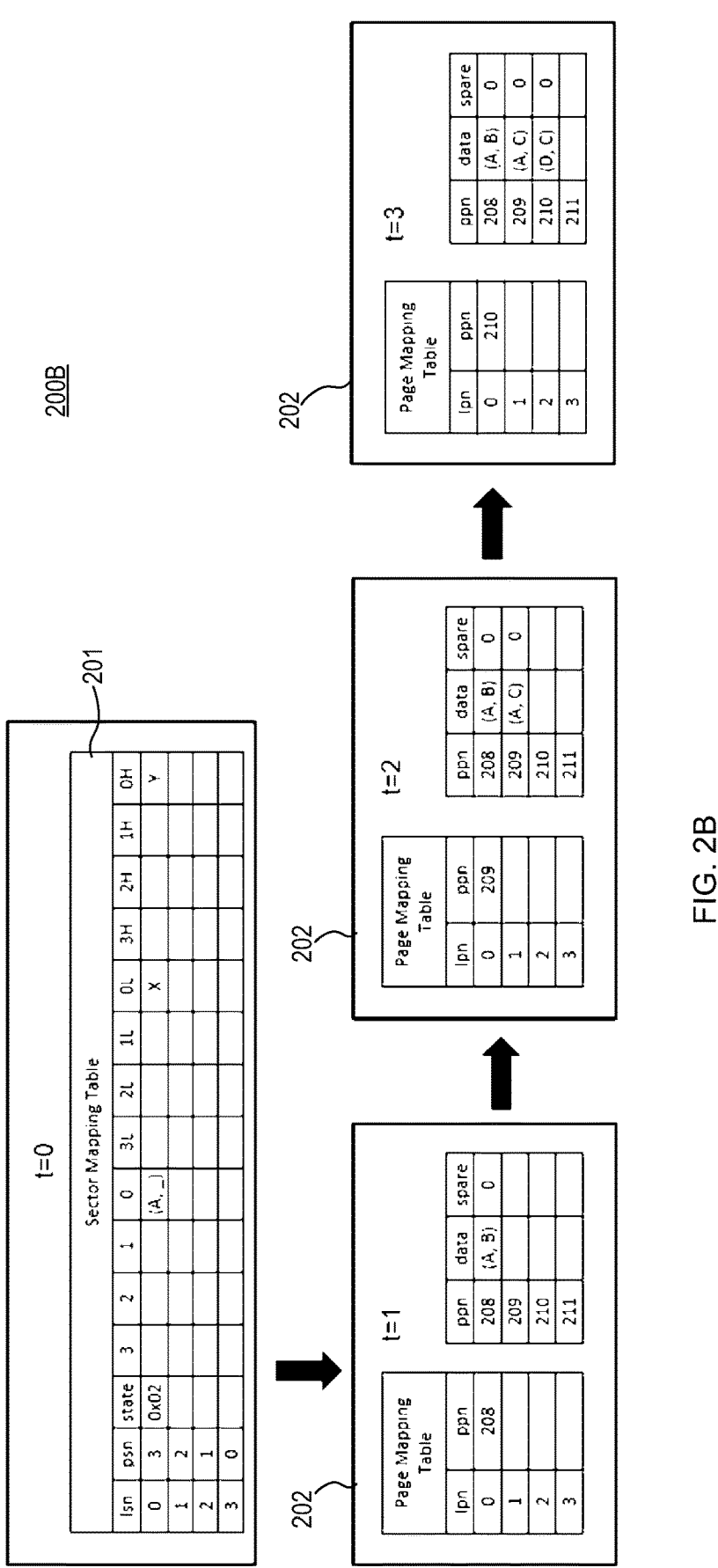
FIG. 2B is an exemplary set of mapping tables and flow of updates to page table mapping when consecutively programming to the same sub-page, according to some embodiments.

FIG. 2B is an exemplary set of mapping tables 200B and flow of updates to page table mapping when consecutively programming to the same sub-page, according to some embodiments. In the embodiment of FIG. 2B, the access granularity is two per page, thus a half-page granularity. Thus, the set of mapping tables 200B also includes a sector mapping table 201 and one or more page mapping tables 202, and the flow to update the mapping tables is similar to that of FIG. 2A. In some embodiments, the metadata stored in the volatile memory 140 may include, within the translation mapping tables 148, a sector mapping table 201 that maps logical sector numbers to physical sector numbers and a page mapping table 202 associated with the sector mapping table 201. In some embodiments, the page mapping table 202 maps logical page numbers or logical sub-page identifiers to physical page numbers or physical sub-page identifiers, respectively.

In this embodiment, the logical sector number of zero ("0") maps to physical sector number of three ("3"), which indexes a corresponding lower half (L) and upper half (H) of different pages in the sector to different access tokens (e.g., sub-page identifier 0L has access token X and sub-page identifier 0H has access token Y). Further, in the page mapping table 202, access to data in a lower half (L) of a page and in a higher half (H) of the page may be separately tracked with respective sub-page identifiers. As illustrated, data (A, B) was originally programmed, at time equal to one, to logical page number zero ("0") and physical page number 208 with a "spare" value of zero. As time moves on and additional operations are performed, the same logical page number is mapped to physical page number 209 with data (A, C) at time equal to two, and at time equal to three, is mapped to physical page number 210 with data (D, C).

As before, the physical pages that contain old or outdated data may be marked as dirty or invalid. The FTL logic 122 may further, in response to reaching a threshold number of physical addresses being marked as invalid, perform garbage collection to erase pages or sectors of invalid physical addresses within the array.

FIG. 3A is a flow diagram of a method 300A for employing FTL logic on-chip of a flash IC device when consecutively programming to the same physical address, according to at least one embodiment. The method 300A can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300A is performed by the FTL logic 122 of (e.g., included in) the flash device 120 of FIG. 1 or other flash memory. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 305, the processing logic receives, from the host device 102, a write command including a first logical address, user data, and an access token.

At operation 310, the processing logic translates the first logical address to a first physical address of an array of flash memory on the flash memory chip. In some embodiments, the first physical address has already been programmed.

At operation 315, the processing logic verifies the access token as being associated with the first logical address.

At operation 320, the processing logic causes the user data to be programmed to a second physical address of the array.

At operation 325, the processing logic updates at least one logical-to-physical (L2P) mapping table with the second physical address as being mapped to the first logical address. In some embodiments, the at least one L2P mapping tables includes at least one sector mapping table and at least one page mapping table.

Figure 3B:
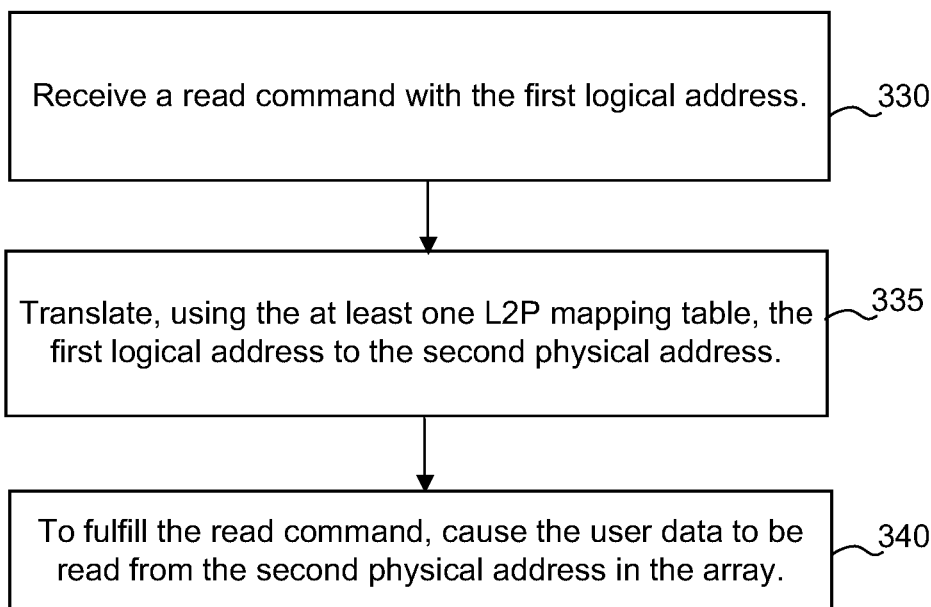
FIG. 3B is a flow diagram of a method for reading from the same physical address that had been written to consecutive times, according to an embodiment.

FIG. 3B is a flow diagram of a method 300B for reading from the same physical address that had been written to consecutive times, according to an embodiment. The method 300B can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300B is performed by the FTL logic 122 of the flash device 120 of FIG. 1. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 330, the processing logic receives a read command comprising the first logical address, e.g., from the host device 102.

At operation 335, the processing logic translates, using the at least one L2P mapping table, the first logical address to the second physical address.

At operation 340, the processing logic, to fulfill the read command, causes the user data to be read from the second physical address in the array.

FIG. 3C is a flow diagram of a method 300C for configuring FTL logic to track the consecutive programming to the same physical address, according to at least some embodiments. The method 300C can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300C is performed by the FTL logic 122 of (or included in) the flash device 120 of FIG. 1 or other flash memory. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 350, the processing logic determines the first physical address has already been programmed.

At operation 355, the processing logic marks, in the at least one L2P mapping table, the first physical address as invalid.

At operation 360, the processing logic receives an additional write command directed at the first logical address. Thus, consider the method 300C as being an extension of the method 300A involving additional, sequential write commands.

At operation 365, the processing logic marks the second physical address as invalid in the at least one L2P mapping table.

At operation 370, the processing logic, in response to a threshold number of physical addresses being marked as invalid, performing garbage collection to erase pages or sectors of invalid physical addresses within the array.

Figure 4:
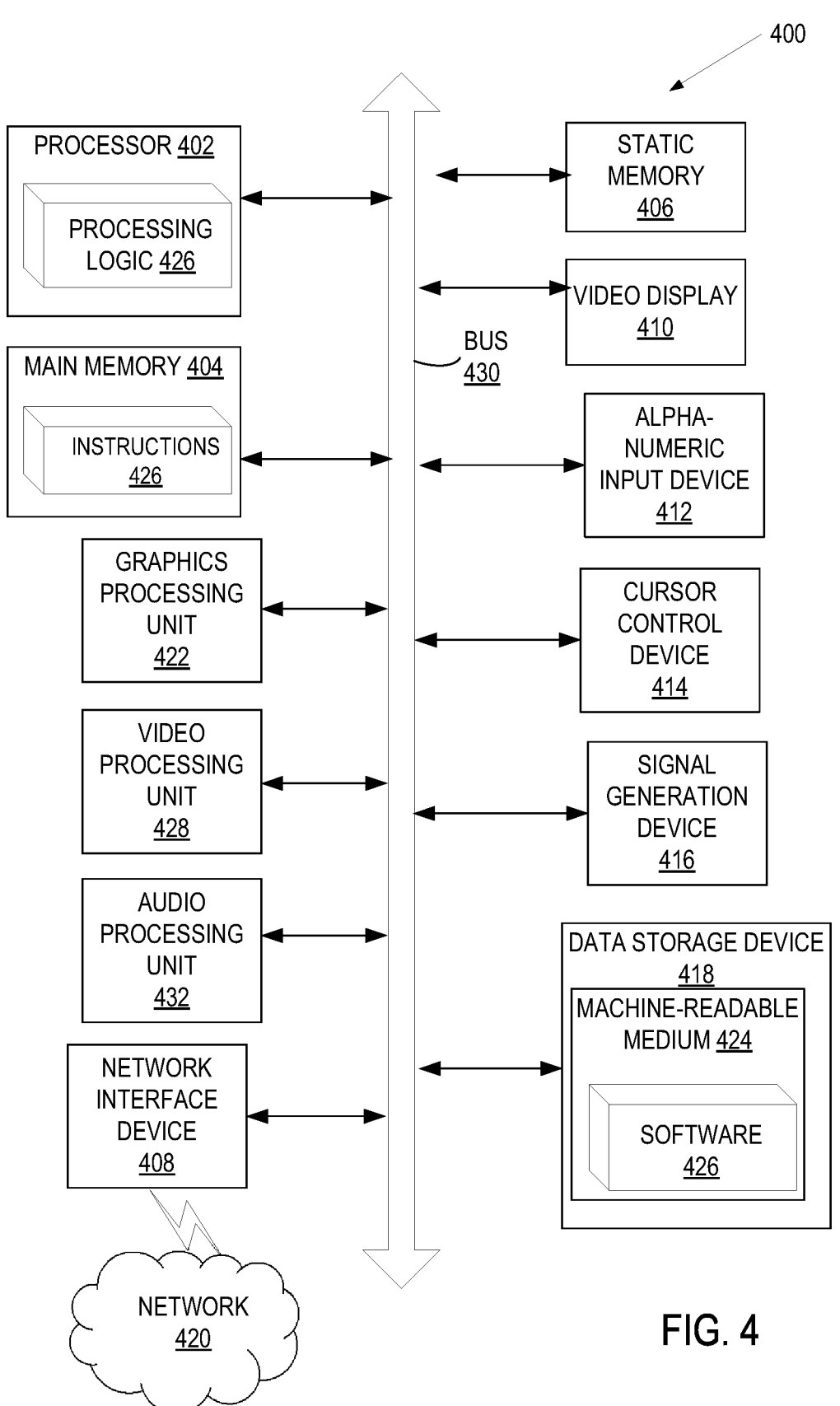
FIG. 4 illustrates a diagrammatic representation of a machine in the example form of a computing system within which a set of instructions, for causing the machine to perform any one or more of the methodologies discussed herein, may be executed.

FIG. 4 illustrates a diagrammatic representation of a machine in the example form of a computing system 400 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a host computing system or computer, an automotive computing device, a server, a network device for an automobile network such as a controller area network (CAN) or local interconnected network (LIN), or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The implementations of the converting pages and sections may be implemented in computing system 400.

The computing system 400 includes a processing device 402, main memory 404 (e.g., read-only memory (ROM), flash memory, dynamic random access memory (DRAM) (such as synchronous DRAM (SDRAM) or DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor device, central processing unit, or the like processing device. More particularly, the processing device may be complex instruction set computing (CISC) microprocessor device, reduced instruction set computer (RISC) microprocessor device, very long instruction word (VLIW) microprocessor device, or processing device implementing other instruction sets, or processing devices implementing a combination of instruction sets. Processing device 402 may also be one or more special-purpose processing devices such as an application specific integrated circuit (ASIC), a field programmable gate array (FPGA), a digital signal processing device (DSP), network processing device, or the like. In one implementation, processing device 402 may include one or more processing device cores. The processing device 402 is configured to execute instructions 426 for performing the operations discussed herein. In one implementation, processing device 402 may be part of the system 100 of FIG. 1.

Alternatively, the computing system 400 may include other components as described herein. The computing system 400 may further include a network interface device 408 communicably coupled to a network 420. The computing system 400 also may include a video display unit 410 (e.g., a liquid crystal display (LCD)), an alphanumeric input device 412 (e.g., a keyboard), a cursor control device 414 (e.g., a mouse), a signal generation device 416 (e.g., a speaker), or other peripheral devices. Furthermore, computing system 400 may include a graphics processing unit 422, a video processing unit 428 and an audio processing unit 432. In another implementation, the computing system 400 may include a chipset (not illustrated), which refers to a group of integrated circuits, or chips, which are designed to work with the processing device 402 and controls communications between the processing device 402 and external devices. For example, the chipset may be a set of chips on a motherboard that links the processing device 402 to very high-speed devices, such as main memory 404 and graphic controllers, as well as linking the processing device 402 to lower-speed peripheral buses of peripherals, such as USB, PCI, or ISA buses.

The data storage device 418 may include a computer-readable storage medium 424 on which is stored instructions 426 embodying any one or more of the methodologies of functions described herein. The instructions 426 may also reside, completely or at least partially, within the main memory 404 as instructions 426 and/or within the processing device 402 as processing logic during execution thereof by the computing system 400; the main memory 404 and the processing device 402 also constituting computer-readable storage media.

The computer-readable storage medium 424 may also be used to store instructions 426 utilizing the processing device 402, such as described with respect to FIG. 1, and/or a software library containing methods that call the above applications. While the computer-readable storage medium 424 is shown in an example implementation to be a single medium, the term "computer-readable storage medium" should be taken to include a single medium or multiple media (e.g., a centralized or distributed database, and/or associated caches and servers) that store the one or more sets of instructions. The term "non-transitory, computer-readable storage medium" shall also be taken to include any medium that is capable of storing, encoding or carrying a set of instructions for execution by the machine and that cause the machine to perform any one or more of the methodologies of the implementations. The term "computer-readable storage medium" shall accordingly be taken to include, but not be limited to, solid-state memories, and optical and magnetic media.

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as may be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one implementation, refers to some apparatus, logic, hardware, and/or element designed in such a way to enable use of the apparatus, logic, hardware, and/or element in a specified manner. Note as above that use of to, capable to, or operable to, in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "adjusting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments described herein may also relate to an apparatus for performing the operations herein. This apparatus may be specially constructed for the required purposes, or it may comprise a general-purpose hardware selectively activated or reconfigured by a firmware stored therein. Such firmware may be stored in a non-transitory computer-readable storage medium, such as, but not limited to, NVMs, read-only memories (ROMs), random access memories (RAMs), EPROMs, EEPROMs, flash memory, or any type of media suitable for storing electronic instructions. The term "computer-readable storage medium" should be taken to include a single medium or multiple media that store one or more sets of instructions. The term "computer-readable medium" shall also be taken to include any medium that is capable of storing, encoding or carrying a set of instructions for execution by the hardware and that causes the hardware to perform any one or more of the methodologies of the present embodiments. The term "computer-readable storage medium" shall accordingly be taken to include, but not be limited to, solid-state memories, optical media, electromagnetic media, any medium that is capable of storing a set of instructions for execution by hardware and that causes the hardware to perform any one or more of the methodologies of the present embodiments.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely exemplary. Particular embodiments may vary from these exemplary details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

In the above description, for purposes of explanation, numerous specific details are set forth in order to provide a thorough understanding of the present disclosure. It will be evident, however, to one skilled in the art that the present disclosure may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the disclosure. The phrase "in one embodiment" located in various places in this description does not necessarily refer to the same embodiment.

What is claimed is:

1. An integrated circuit comprising:
an array of flash memory;
a volatile memory; and
flash translation layer (FTL) logic coupled to the array and to the volatile memory, wherein the FTL logic is to be connected to a host device and is configured to:
  receive, from the host device, an encrypted write command comprising a first logical address, user data, and an access token;
  decrypt the encrypted write command to obtain the first logical address, the user data, and the access token;
  retrieve, from access metadata stored in the volatile memory, a stored access token that is associated with the first logical address;
  translate the first logical address to a first physical address of the array, wherein the first physical address has already been programmed;
  verify the access token as matching the stored access token and thus being associated with the first logical address;
  cause the user data to be programmed to a second physical address of the array in response to determining that the first physical address has already been programmed; and update at least one logical-to-physical (L2P) mapping table with the second physical address as being mapped to the first logical address.

2. The integrated circuit of claim 1, wherein the first logical address comprises a logical sector number and one of a logical page number or a logical sub-page identifier, which the FTL logic is to use to determine the first physical address comprising a physical sector number and one of a physical page number or a physical sub-page identifier.

3. The integrated circuit of claim 2, wherein the volatile memory is to store metadata comprising:
  a sector mapping table that maps logical sector numbers to physical sector numbers; and
  a page mapping table associated with the sector mapping table that maps one of logical page numbers or logical sub-page identifiers to one of physical page numbers or physical sub-page identifiers.

4. The integrated circuit of claim 1, further comprising a volatile memory coupled to the FTL logic that the FTL logic uses to verify logical addresses received from the host device, wherein the volatile memory stores metadata that indexes logical addresses to access tokens.

5. The integrated circuit of claim 1, wherein the FTL logic is further configured to:
  determine the first physical address has already been programmed; and
  mark the first physical address in the at least one L2P mapping table as being invalid.

6. The integrated circuit of claim 5, wherein the FTL logic is further configured to:
  receive an additional write command directed at the first logical address;
  mark, in the at least one L2P mapping table, the second physical address as invalid; and
  in response to a threshold number of physical addresses being marked as invalid, perform garbage collection to erase pages or sectors of invalid physical addresses within the array.

7. The integrated circuit of claim 1, wherein the FTL logic is further configured to:
  receive a read command comprising the first logical address;
  translate, using the at least one L2P mapping table, the first logical address to the second physical address; and
  to fulfill the read command, cause the user data to be read from the second physical address in the array.

8. A method comprising:
  receiving, by flash translation layer (FTL) logic included in a flash memory integrated circuit (IC), from a host device, an encrypted write command comprising a first logical address, user data, and an access token;
  decrypting, by the FTL logic, the encrypted write command to obtain the first logical address, the user data, and the access token;
  retrieving, from access metadata stored in a volatile memory of the flash memory IC, a stored access token that is associated with the first logical address;
  translating the first logical address to a first physical address of an array of flash memory on the flash memory IC, wherein the first physical address has already been programmed;
  verifying the access token as matching the stored access token and thus being associated with the first logical address;

15

16 causing, by the FTL logic, the user data to be programmed to a second physical address of the array in response to determining that the first physical address has already been programmed; and updating, by the FTL logic, at least one logical-to-physical (L2P) mapping table with the second physical address as being mapped to the first logical address.

9. The method of claim 8, wherein the first logical address comprises a logical sector number and one of a logical page number or a logical sub-page identifier, the method further comprising:

determining the first physical address comprising a physical sector number corresponding to the logical sector number; and determining one of a physical page number or a physical sub-page identifier corresponding to the one of the logical page number or the logical sub-page identifier.

10. The method of claim 9, further comprising:

storing, in the volatile memory of the flash memory IC, metadata used to perform L2P address translations;

mapping, using a sector mapping table of the metadata, the logical sector number of the first logical address to the physical sector number; and mapping, using a page mapping table of the metadata, the one of the logical page number or the logical sub-page identifier of the first logical address to one of the physical page number of the physical sub-page identifier.

11. The method of claim 9, further comprising:

storing, in the volatile memory of the flash memory IC, metadata comprising logical addresses indexed to access tokens; and verifying, using the metadata, the first logical address by comparing the access token received in the encrypted write command with the access token indexed against the first logical address in the metadata.

12. The method of claim 9, further comprising:

determining the first physical address has already been programmed; and marking the first physical address in the at least one L2P mapping table as being invalid.

13. The method of claim 12, further comprising:

receiving an additional write command directed at the first logical address;

marking, in the at least one L2P mapping table, the second physical address as invalid; and in response to a threshold number of physical addresses being marked as invalid, performing garbage collection to erase pages or sectors of invalid physical addresses within the array.

14. The method of claim 9, further comprising:

receiving a read command comprising the first logical address;

translating, using the at least one L2P mapping table, the first logical address to the second physical address; and to fulfill the read command, causing the user data to be read from the second physical address in the array.

15. A system comprising:

a host processing device lacking embedded flash memory; and a flash memory integrated circuit (IC) connected directly to the host processing device, the flash memory IC comprising:

a memory array;

a volatile memory; and flash translation layer (FTL) logic coupled to the memory array and the volatile memory, wherein the FTL logic is configured to:

receive, from the host processing device, an encrypted write command comprising a first logical address, user data, and an access token;

decrypt the encrypted write command to obtain the first logical address, the user data, and the access token;

retrieve, from access metadata stored in the volatile memory, a stored access token that is associated with the first logical address;

translate the first logical address to a first physical address of the memory array, wherein the first physical address has already been programmed;

verify the access token as matching the stored access token and thus being associated with the first logical address;

cause the user data to be programmed to a second physical address of the memory array in response to determining that the first physical address has already been programmed; and update at least one logical-to-physical (L2P) mapping table with the second physical address as being mapped to the first logical address.

16. The system of claim 15, wherein the host processing device is one of a microcontroller unit (MCU) or an application processor.

17. The system of claim 15, wherein the host processing device is configured to provide a unique access token with each respective memory command having a unique logical address; and the flash memory IC further comprises a volatile memory coupled to the FTL logic, wherein the FTL logic is further configured to:

index, within the volatile memory, a plurality of logical addresses with a plurality of corresponding access tokens; and verify logical addresses of the plurality of logical addresses received from the host processing device using the corresponding access tokens retrieved from the volatile memory.

18. The system of claim 15, wherein the volatile memory is to store metadata comprising:

a sector mapping table that maps logical sector numbers to physical sector numbers of the memory array; and a page mapping table associated with the sector mapping table that maps one of logical page numbers or logical sub-page identifiers to one of physical page numbers or physical sub-page identifiers of the memory array.

19. The system of claim 15, wherein the host processing device is configured to execute an application programming interface (API) to encrypt a write command to generate the encrypted write command.

20. The system of claim 15, wherein the FTL logic is further configured to:

determine the first physical address has already been programmed;

mark the first physical address in the at least one L2P mapping table as being invalid;

receive an additional write command directed at the first logical address;

mark, in the at least one L2P mapping table, the second physical address as invalid; and in response to a threshold number of physical addresses being marked as invalid, perform garbage collection to erase pages or sectors of invalid physical addresses within the memory array.

21. The system of claim 15, wherein the FTL logic is further configured to:

receive a read command comprising the first logical address;

translate, using the at least one L2P mapping table, the first logical address to the second physical address; and to fulfill the read command, cause the user data to be read from the second physical address in the memory array.

\* \* \* \* \*